United States Patent
Noe et al.

(10) Patent No.: US 9,508,234 B2
(45) Date of Patent: Nov. 29, 2016

(54) CARGO COMPARTMENT INDICATION FOR TIE DOWN RESTRAINT LOCATIONS

(71) Applicant: The Boeing Company, Chicago, IL (US)

(72) Inventors: Darrin M. Noe, Arlington, WA (US); Robert A. Stevens, Stanwood, WA (US)

(73) Assignee: THE BOEING COMPANY, Chicago, IL (US)

( * ) Notice: Subject to any disclaimer, the term of this patent is extended or adjusted under 35 U.S.C. 154(b) by 226 days.

(21) Appl. No.: 14/301,628

(22) Filed: Jun. 11, 2014

(65) Prior Publication Data

US 2015/0364016 A1 Dec. 17, 2015

(51) Int. Cl.
| | | |
|---|---|---|
| G08B 5/36 | (2006.01) | |
| B64D 9/00 | (2006.01) | |
| G01C 15/02 | (2006.01) | |
| B64C 1/22 | (2006.01) | |

(52) U.S. Cl.
CPC ............... G08B 5/36 (2013.01); B64D 9/003 (2013.01); B64C 1/22 (2013.01); B64D 9/00 (2013.01); G01C 15/02 (2013.01)

(58) Field of Classification Search
None
See application file for complete search history.

(56) References Cited

U.S. PATENT DOCUMENTS

| | | | |
|---|---|---|---|
| 2005/0246132 A1* | 11/2005 | Olin .......................... | B64C 1/20 702/174 |
| 2013/0166063 A1 | 6/2013 | Panzram et al. | |
| 2014/0017058 A1 | 1/2014 | Barmichev et al. | |

OTHER PUBLICATIONS

Form PCT/ISA/220, Notification of Transmittal of the International Search Report and the Written Opinion of the International Searching Authority, or the Declaration dated May 4, 2015.
"Heathrow Photo Library." Heathrow, n.d. Web. Jun. 11, 2014. <http://photolibrary.heathrow.com/preview.aspx?ref=CHE04267d>.
"Installation Instructions Gridline G6 with No Frame." Construction Specialties, n.d. Web. Jun. 11, 2014. <http://www.c-sgroup.com/files/tech-center/efs/install/pdf/G6P-No_$_{Frame}$_1.pdf>.
"Tiedown and Restraint 102." ATTLA: Dod Focal Point for Air Transportability and Airdrop Issues.
"Vinyl Safety/Reflective Tape." ULINE, n.d. Web. Jun. 11, 2014. <http://www.uline.com/Grp_112/Vinyl-Safety-Reflective-Tapes?pricode=WG101
&gclid=CKSBgdmls70CFVKlfgodWJoAVA&gclsrc=aw.ds>.
DiBernardo, Greg. "Tool Test: Affordable Line Lasers." Tools of the Trade Winter 2012, Feb. 16, 2012. Web. Jun. 11, 2014. <http://www.toolsofthetrade.net/lasers/tool-test-affordable-line-lasers_2.aspx>.
PRWeb, n.d. Web. Jun. 11, 2014. <http://ww1.prweb.com/prfiles/2011/05/17/9104231/5S-floor-marking-ideas.jpg>.

* cited by examiner

*Primary Examiner* — Daniell L Negron
(74) *Attorney, Agent, or Firm* — McDonnell Boehnen Hulbert & Berghoff LLP

(57) ABSTRACT

A system and method for identifying tie down restraint locations in a cargo compartment or other storage area is disclosed. The system includes labeling or otherwise highlighting the tie down locations on a floor where the cargo is to be secured. The labeling is based on a reference coordinate system that is associated with a tie down plan. Additionally or alternatively, a tie down locator device is mounted above the floor that highlights or otherwise illuminates a tie down location. As a cargo handler completes a connection, the device highlights the next tie down location.

20 Claims, 4 Drawing Sheets

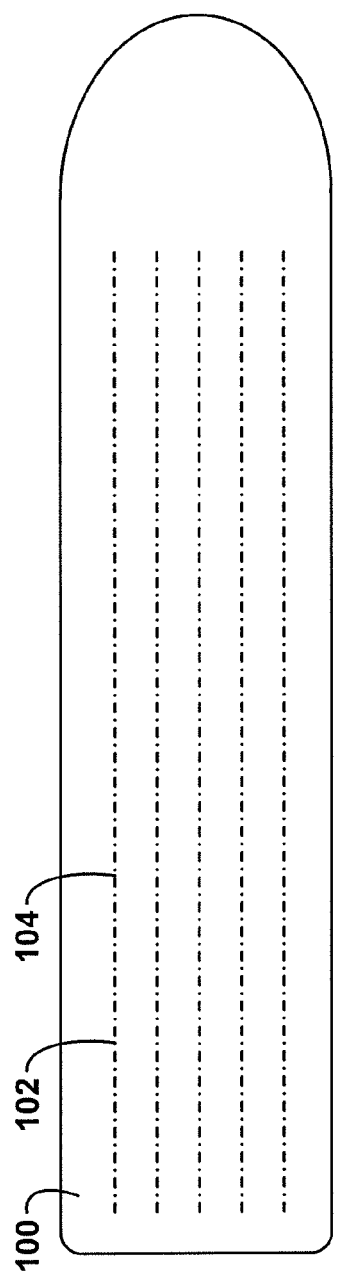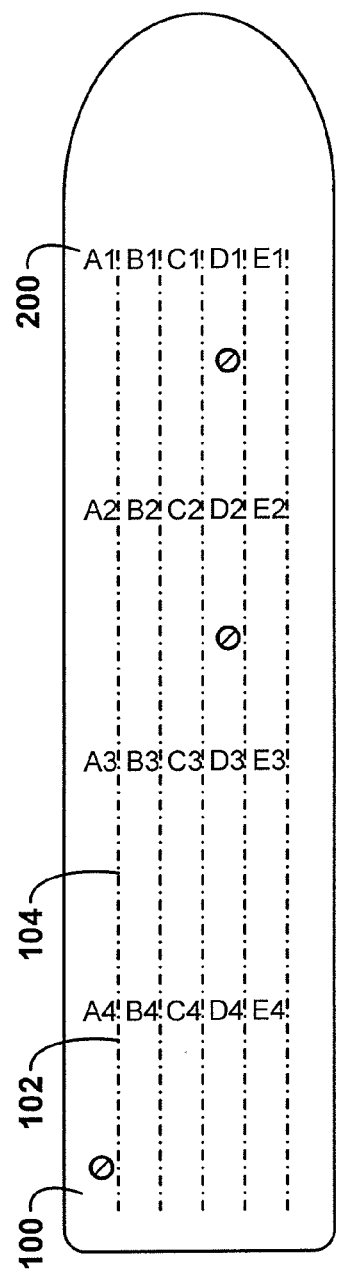
Figure 1
Figure 2

CARGO COMPARTMENT INDICATION FOR TIE DOWN RESTRAINT LOCATIONS

FIELD

The disclosure is related to securing cargo and, more particularly, to identifying connection locations for tie down restraints for securing cargo.

BACKGROUND

Every day cargo is transported from one location to another via airplanes, trains, boats, and trucks. Tie down restraints are commonly used to secure the cargo in these vehicles. A tie down restraint (also referred to as a cargo restraint) is a strap with a mechanism on each end that can be connected to an anchor point on the floor or other location in the vehicle. Once secured using one or more tie down restraints, the cargo is less likely to move while the vehicle is moving.

For example, airlifted cargo is restrained so it will not shift during flight. Dynamic forces caused by various flight conditions (e.g., take off, landing, air turbulence) tend to move the cargo in various directions. These forces are proportional to the cargo's weight and the rate of change in the aircraft's flight velocity.

Typically, a tie down plan for restraining the cargo is created to counteract these dynamic forces. The tie down plan includes the number of restraints necessary to secure the cargo and what anchor points to use. The tie down plan can be prepared onsite at time of cargo loading or prepared in an office or somewhere else remote from the vehicle using weight and calculation tables applicable to the vehicle.

Once at the vehicle, it is challenging to implement the tie down plan because it is difficult to identify the proper tie down restraint locations (i.e., where to connect the tie down restraints). If the cargo is not properly secured, the cargo and the vehicle may be damaged. Shifting cargo can also cause vehicle accidents, which can result in bodily injury or death, as well as other property damage.

Thus, it would be beneficial to provide a system and method for accurately implementing a tie down plan for securing cargo.

SUMMARY

A system and method for identifying tie down restraint locations is disclosed. In one example, the system for identifying tie down restraint locations includes a floor area having anchor points for connecting tie down restraints, a tie down plan that identifies which of the anchor points to use for securing cargo, and coordinate markers affixed to the floor area near to some of the anchor points to facilitate connection of the tie down restraints to the anchor points based on the tie down plan.

In another example, the system for identifying tie down restraint locations includes a floor area having a plurality of nodes for connecting an end of a tie down restraint, a tie down plan that identifies which of the nodes to use for securing cargo, and a device located above the floor area that receives the tie down plan and generates a light beam directed towards a tie down location based on the tie down plan.

The method for identifying tie down restraint locations includes receiving a tie down plan for securing cargo, retrieving location data associated with a tie down location identified in the tie down plan, and directing a light beam at the tie down location to indicate where to connect a tie down restraint. The method also includes receiving an indication that the tie down restraint is connected at the tie down location and determining whether another tie down location is identified in the tie down plan. If there is another tie down location identified in the tie down plan, the method repeats until the tie down plan is completed.

The features, functions, and advantages that have been discussed can be achieved independently in various embodiments or may be combined in other embodiments further details of which can be seen with reference to the following description and drawings.

BRIEF DESCRIPTION OF THE DRAWINGS

Presently preferred embodiments are described below in conjunction with the appended drawing figures, wherein like reference numerals refer to like elements in the various figures, and wherein:

FIG. 1 is an illustration of tie down locations in an airplane, according to an example;

FIG. 2 is an illustration of a coordinate system for identifying tie down locations in an airplane, according to an example;

Figure 3:
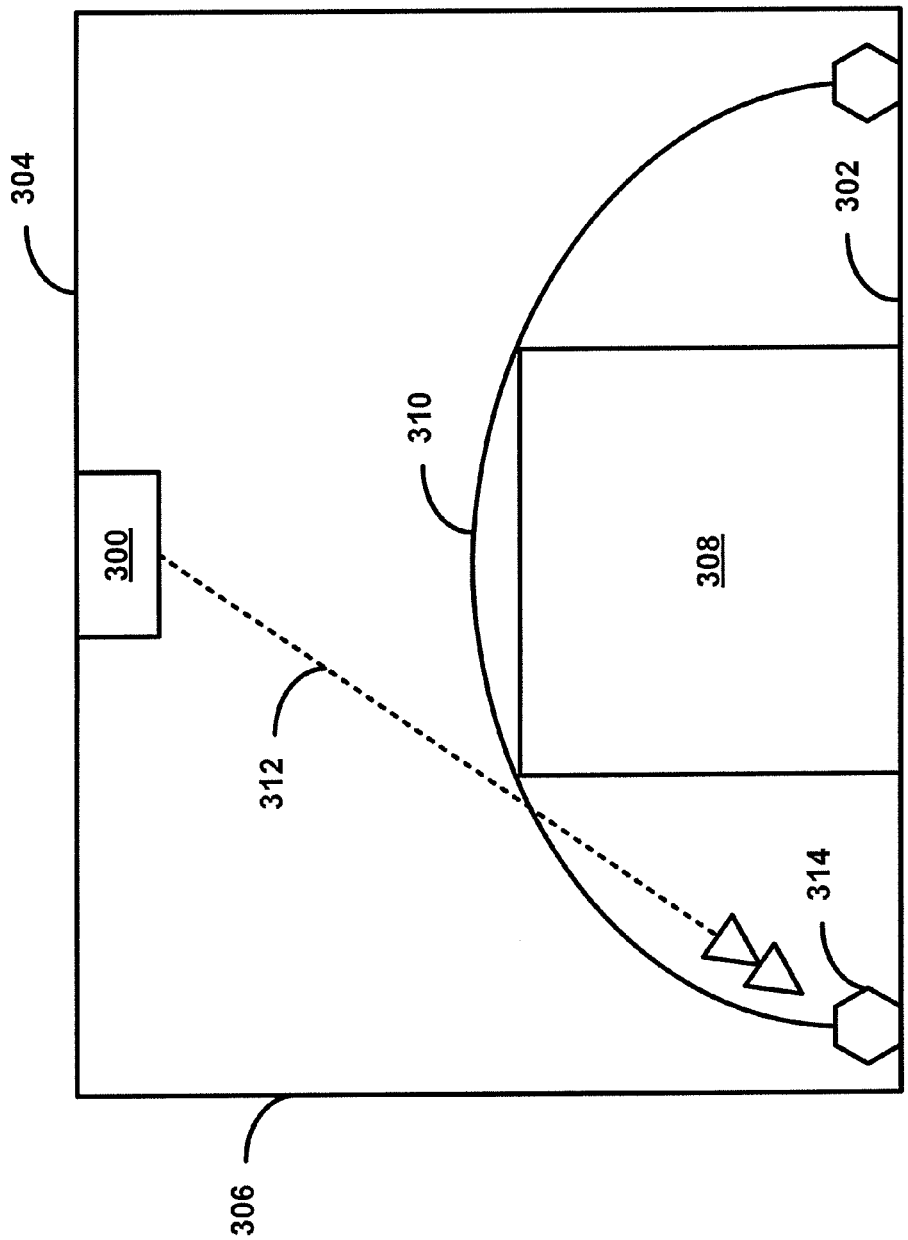
FIG. 3 is an illustration of a system for projecting tie down locations on a floor of a vehicle, according to an example.

The drawings are for the purpose of illustrating example embodiments, but it is understood that the inventions are not limited to the arrangements and instrumentality shown in the drawings.

DETAILED DESCRIPTION

FIG. 1 depicts a floor 100 of a storage area. For example, the floor 100 may be a main deck cargo compartment floor of a cargo airplane or a lower deck floor located underneath the passenger compartment of a commercial airplane. The floor 100 may also be located in a rail car, a cargo ship, a tractor trailer truck, or other vehicle transporting cargo. In another example, the floor 100 may be located in a warehouse or other facility where cargo is arranged prior to shipping.

The floor 100 has a plurality of connection or anchor points, commonly referred to as nodes 102 (shown as dots in FIG. 1). The nodes 102 are tie down restraint attachment locations for connecting an end of a tie down strap. For example, an aircraft main deck cargo compartment floor typically includes a plurality of seat tracks 104 (five shown in FIG. 1) oriented along the longitudinal axis of the aircraft. The seat tracks 104 have a series of nodes 102 that are spaced close together. For example, the nodes 102 may be spaced approximately one inch apart along the seat track 104. The nodes 102 may be spaced apart at different regular distances (e.g., 2 inches apart) or at irregular distances as well.

Additionally, the nodes 102 may be connected to the floor 100 in different manner than using the seat track 104. For example, there are a variety of other track designs. As another example, the nodes 102 may be connected to stand alone anchor points or on other equipment attached to the floor 100.

FIG. 1 depicts one example of how the nodes 102 are arranged on the floor 100. The node arrangement varies depending on where the floor 100 is located. For example, different vehicle types are likely to have different node arrangements. The node arrangement may also vary depending on cargo type. For example, two cargo airplanes of the same model may have different node arrangements based on the type of cargo expected to be transported.

The end of each tie down restraint has a fitting that can attach to the node 102. There are a variety of tie down restraint designs. A tie down restraint has a rated strength, which is the load or force it is designed to withstand. For example, a tie down restraint rated for 5000 pounds may be a webbed nylon strap about 20 feet long with a fixed snap hook on one end and an adjustable hook on the other. The adjustable hook end may have a ratchet system for tensioning.

As another example, a tie down restraint rated for 10,000 pounds may have an adjustable hook, tension collar, chain lock, a quick-release lever, and a 9-foot steel chain with an L-shaped hook on one end. In use, the L-shaped hook end of the chain is passed over the load, and the hook is then engaged with a link of chain. The adjustable hook end of the device is attached to a tie-down ring. The quick-release lever makes it possible to detach the device, regardless of the tension on the chain. The tension collar permits final tensioning of the chain.

Typically, the nodes 102 look the same. Yet different nodes 102 may have different strength capabilities or ratings. Thus, depending on the cargo weight and the dynamic forces expected during transportation, it is important to use the proper node under the circumstances. Additionally, some nodes 102 are not designed to be used with tie down restraints.

Thus, a tie down plan is created to make sure that the cargo is properly secured in the storage area. The tie down plan may be generated manually or with a storage plan generator. In one example, the storage plan generator includes a software program running on a general purpose computer. For example, the software program may be a Computer Aided Design (CAD) program, such as Catia.

In another example, the storage plan generator is a computer or software program that is specifically designed for generating tie down plans. For example, Integrated Computerized Deployment System (ICODES) is a web-based, enterprise technology for multi-modal, load-planning operations offered by Tapestry Solutions, Inc. ICODES enables users to plan and track cargo stowage for air, ocean, rail, and truck in a single system. ICODES includes reference libraries that stores data found in weight and balance manuals, including node locations and node characteristics (e.g., hardware strength, whether node can be used for tie down restraints).

Whether the tie down plan is created manually or with a storage plan generator, the plan specifies the number of tie down restraints needed to properly restrain the cargo, and the order and attachment locations for those tie down restraints. For example, the plan may indicate that ten tie down restraints are needed, and that the first end of the first restraint (1A) should be connected to node "x" and the second end of the first restraint (1B) should be connected to node "y." Then, the plan continues with the second restraint ends (2A, 2B) and so on until providing the tie down restraint locations for all ten restraints.

The tie down plan may be linear as just described, or may provide for parallel installation. For example, the plan might identify two tie down restraint ends that can be connected to their respective tie down locations at the same time. Additionally, the plan may include connecting the first end of more than one tie down restraint before connecting the second ends (e.g., 1A node x, 2A node y, . . . 1B node m, 2B node n, . . . ).

In one example, a cargo handler implements the tie down plan using a coordinate system overlaying the floor 100. One example of a coordinate system 200 is shown in FIG. 2. In this example, the coordinate system 200 is an alpha-numeric system. There are other possible coordination systems that could be used, such as a color-coded system or a system that uses a variety of shapes, symbols, or other graphics.

Additionally, multiple coordinate systems may be used together. For example, the alpha-numeric coordinate system may also be color-coded. In this example, the letters and numbers may help the cargo handler find the correct tie down location, while the color provides an indication of node strength. The type of coordinate system used may depend on vehicle type as well as the available tie down locations.

The coordinate system may be designed to coordinate with the graphics used by the storage plan generator or in weight and balance manuals. For example, the cargo handler may receive a copy of the tie down plan that uses only numbers to identify the nodes 102 because the storage plan generator numbers the nodes 102 sequentially. In this example, numerical coordinate markers or labels are placed near the nodes 102.

In the example shown in FIG. 2, the coordinate markers are affixed to the floor 100 at a distance greater than the distance between nodes 102. For example, if the nodes 102 are spaced apart every inch along the seat track 104, the coordinate markers may be placed at 10-20" increments. This may be sufficient for the cargo handler to easily identify the correct tie down location without overly complicating the floor markings. Of course, a coordinate marking may be placed near every node 102.

The coordinate markers also identify areas not to be used for tie down locations. For example, the "no" symbol (a circle with a diagonal line through it running from top left to bottom right) may be placed adjacent to a node 102 that is not suitable for tie down restraints. As another example, the color red may be placed adjacent to a node 102 that is not suitable for tie down restraints.

The coordinate markers may also include radio-frequency identification (RFID) tags or similar type tags. The tags store node characteristics, such as node identification, hardware strength, and whether the node 102 is suitable for tie down restraints. A cargo handler uses a portable device with an RFID reader, such as a mobile telephone, to verify whether she has selected the correct tie down location and obtain information regarding the node 102.

The coordinate markers are placed on the floor 100 using any compatible floor labeling mechanism. For example, the coordinate markers may be printed on PVC floor tape that is affixed to the floor 100 with an adhesive. An over-laminate may be used to provide extra protection for the floor tape. For some vehicles, such as airplanes, the coordinate markers are affixed to the floor 100 per government overlay requirements.

In another example, a cargo handler implements the tie down plan by following a series of lighted indications. FIG. 3 depicts a tie down locator device 300 for projecting tie down locations on a floor 302 of a storage area. In this example, the device 300 is located on the ceiling 304 of the storage area. The device 300 may also be located on a wall 306 of the storage area, preferably closer to the ceiling 304 so the light indications can project on all sides of the cargo.

The device 300 may be attached to the storage area in a permanent or temporary manner. For example, the storage area may include device holders on the ceiling 304 or walls 306 of the storage area and a cargo handler inserts the device 300 into the holder prior to securing the cargo 308 with tie down restraints 310. Once the cargo 308 has been restrained, the cargo handler removes the device 300 from the storage area. For some storage areas, such as cargo compartments in cargo ships, the device 300 may be designed to be permanently attached in the cargo compartment until repair or replacement is necessary.

In operation, the device 300 generates a light beam 312 that identifies a tie down location 314. The cargo handler sees the highlighted tie down location and connects the next tie down restraint end to the node associated with that tie down location. Once the connection is made, the device 300 generates another light beam that identifies the next tie down location.

The device 300 may also be a handheld device and not be physically connected to the storage area during cargo restraint operations. In this example, the cargo handler may receive instructions as to what node 314 to use next and the hand held device 300 provides an indication (e.g., light, audio, haptic, or a message on a display) to confirm that the cargo handler has identified the correct node. The hand held device 300 may also provide node characteristics.

Figure 4:
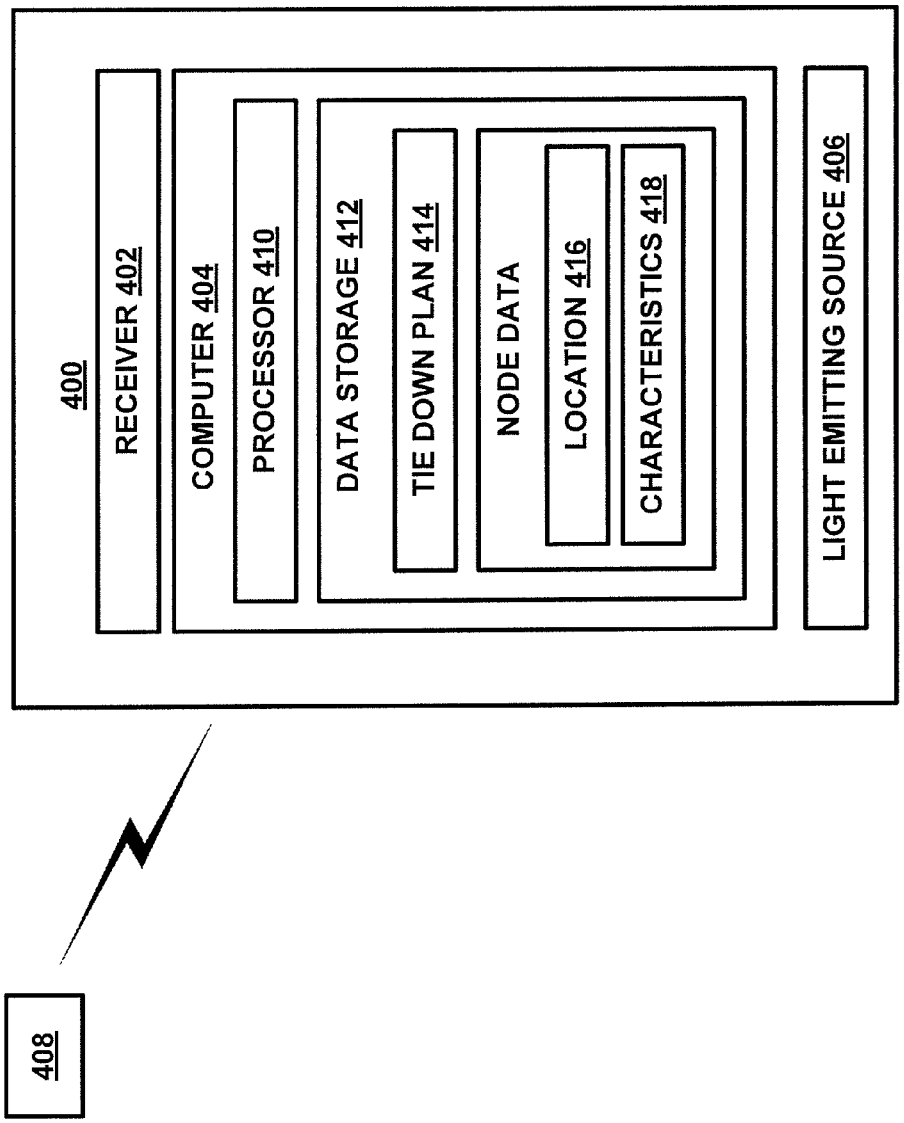
FIG. 4 is an illustration of the tie down locator device depicted in FIG. 3, according to an example.

FIG. 4 depicts a tie down locator device 400, which may be used as the device 300 depicted in FIG. 3. The device 400 includes a receiver 402, a computer 404, and a light emitting source 406. The device 400 may include other components as well, such as a power source.

FIG. 4 shows that the components of the device 400 are packaged together, but this is not necessary. For example, the light emitting source 406 may be located in one location in the storage area (e.g., the center of the ceiling 304) and the receiver 402 may be located in another location (e.g., where the receiver 402 is most likely to receive communications). As another example, a computer used in the storage area for other reasons may perform as the computer 404.

The receiver 402 is a combination of hardware and software components suitable for receiving input signals from external sources over a wireless network via wireless links, such as Bluetooth, any version of IEEE 802.11, or other wireless based communication links. The receiver 402 wirelessly receives a tie down plan from a remote computer 408. For example, the storage plan generator may transmit the tie down plan to the receiver 402.

Additionally or alternatively, a user may input the tie down plan into a user interface physically connected to the receiver 402. The user interface is configured to receive data from an input device, such as a keyboard, a keypad, a touch screen, a computer mouse, a track ball, a joystick, and other similar devices. Beneficially, the user interface may be used to enter the tie down plan when wireless transmissions are not available.

The receiver 402 provides the tie down plan to the computer 404. The computer 404 has at least one processing unit 410 capable of executing machine-language instructions. The computer 404 also includes data storage 412 for storing and executing these instructions. The data storage includes non-transitory media, such as secondary or persistent long term storage, like read only memory (ROM), optical or magnetic disks, compact-disc read only memory (CD-ROM). The data storage also includes transitory computer readable medium, such as computer-readable media that stores data for short periods of time like register memory, processor cache, and Random Access Memory (RAM).

In a stand-alone example, the computer 404 may be a desktop computer, laptop or notebook computer, personal data assistant (PDA), mobile phone, or any similar device. For example, the computer 404 may be a local computer, such as the computer associated with a cargo handling control system. In this example, the cargo handling control system provides commands to electromechanical equipment providing conveyance and guidance of cargo as it is being loaded in a storage area.

The computer 404 receives the tie down plan from the receiver 402 and stores the received tie down plan 414 in data storage 412. The data storage 412 also includes location data 416 and characteristic data 418 for each node in the storage area. Using this information, the computer 404 controls how the light emitting source 406 provides a light indication. Preferably, the light emitting source 406 is a laser that transmits light in the visible spectrum. The light emitting source 406 may also be another light source that can generate a beam of light, such as a lamp.

The light emitting source 406 illuminates nodes to use during the process of securing cargo. The light emitting source 406 can also provide additional information, such as node characteristics. The light emitting source 406 can provide this additional information by using different colors or by projecting characters or other symbols.

Additionally, the light emitting source 406 may provide more than one light indication at the same time. For example, more than one light indication may be used if the tie down plan provides parallel instructions (i.e., more than one tie down restraint can be connected at the same time). As another example, the light emitting source 406 may provide an indication of the next node and that node's characteristics at the same time.

Figure 5:
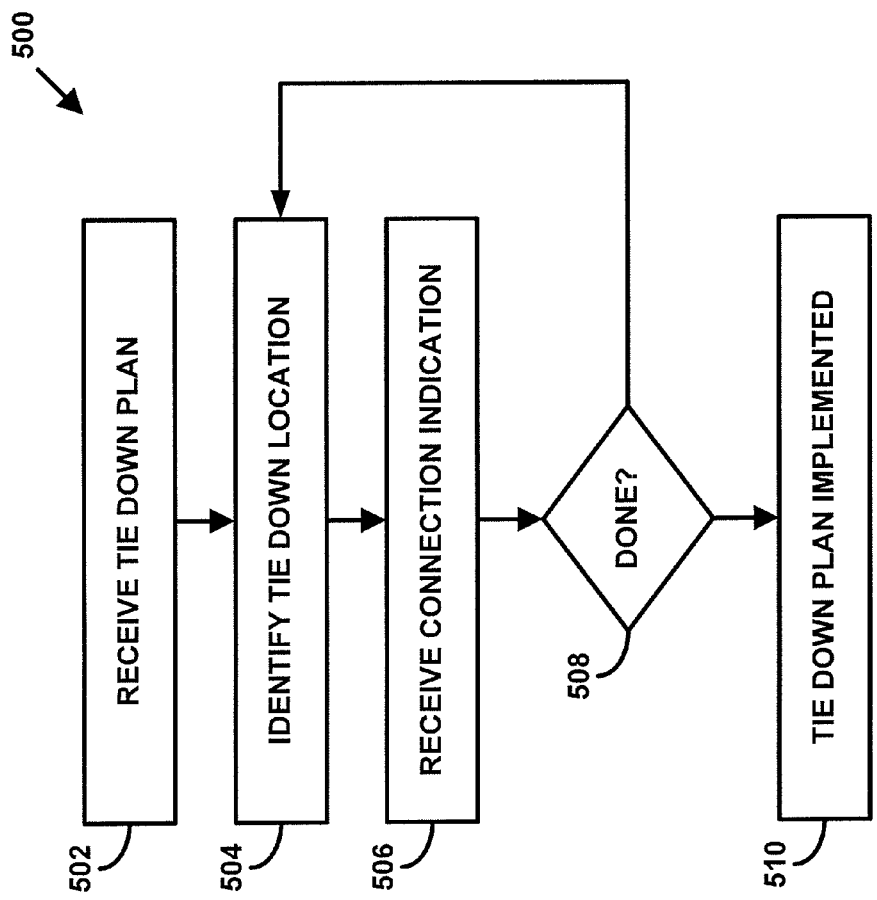
FIG. 5 is an illustration of a method for identifying tie down restraint locations, according to an example.

FIG. 5 is a flow chart depicting a method 500 for identifying tie down restraint locations in a storage area. At block 502, the device 300 wirelessly receives a tie down plan from a remote location. Alternatively, the device 300 receives the tie down plan via a wired connection via a local terminal. The tie down plan includes instructions for securing a container or any other type of cargo in the storage area.

At block 504, the device 300 identifies a tie down location. To identify the tie down location, the device 300 uses computer-readable program instructions, the tie down plan, and the tie down locations. Specifically, the device 300 reads a line of the tie down plan, which identifies a node; retrieves data associated with that node's tie down location; provides that location data to the light emitting source; and the light emitting source directs at least a light beam at that tie down location in the storage area.

The device 300 may also retrieve node characteristic data from data storage. The device 300 may use the node characteristic data to select a light color for the light beam. The device 300 may also use the node characteristic data to control the light emitting source to project more than just a light beam at the tie down location. For example, the light emitting source may project a circle, square, triangle, or other symbol at the tie down location to indicate the node's hardware strength.

At block 506, the device 300 receives a connection indication when an end of the tie down restraint is connected to the node. The cargo handler may provide an indication that she completed the task by providing an input to the user interface, which sends a signal to the device 300. Alternatively, the cargo handler may use a remote control device or other handheld device to send a signal to the device 300 to indicate that she completed the task. As another alternative, the device 300 may detect a break in the light beam for a threshold period of time (e.g., 30 seconds) to determine that the tie down restraint has been connected to that node.

At block 508, the device 300 determines whether there is another instruction in the tie down plan. If so, the method 500 identifies the next tie down location at block 504, which may be the second end of a tie down restraint or a first end of another tie down restraint. As the tie down restraints are typically the same (length and connection fixtures), the device 300 does not need to identify a particular strap. However, if a particular tie down restraint is necessary, the device 300 may use a combination of light colors and patterns to indicate which restraint to use.

If the device 300 determines that there are no more instructions in the tie down plan, then at block 510 the tie down plan is implemented.

The method 500 allows a person located remote from the storage area to develop a tie down plan at their desk, manually or using a storage plan generator, and to transmit the plan to the storage area where it is received by a local computer. The cargo handler proceeds step by step through the plan as the device 300 provides a light indication at each tie down location associated with each tie down restraint. As a result, the cargo handler does not need to translate portions of the tie down plan to determine the intended tie down locations. The method 500 also reduces communication barriers based on language and prevents using nodes not intended to be used as tie down locations.

The physical markings on the floor of the storage area described with respect to FIG. 2 and the lighted indications described with respect to FIGS. 3-5 can be used separately or together. Both systems for identifying tie down restraint locations reduce the time required to secure cargo and improves safety.

It is intended that the foregoing detailed description be regarded as illustrative rather than limiting and that it is understood that the following claims including all equivalents are intended to define the scope of the invention. The claims should not be read as limited to the described order or elements unless stated to that effect. Therefore, all embodiments that come within the scope and spirit of the following claims and equivalents thereto are claimed as the invention.

We claim:

1. A system that identifies tie down restraint locations, comprising:
 a storage plan generator comprising a processor and data storage having instructions that, when executed by the processor, cause the storage plan generator to perform operations comprising:
  receiving storage area information indicative of (i) locations of anchor points for connecting tie down restraints to a storage area, and (ii) weight-carrying characteristics of the anchor points,
  receiving cargo information indicative of (i) weight of cargo to be stored in the storage area, and (ii) forces that the cargo is expected to experience while stored in the storage area,
  based on the storage area information and the cargo information, generating a tie down plan that identifies which of the anchor points to use for securing the cargo; and
 a tie down locator device in communication with the storage plan generator and comprising a light emitting source, a respective processor, and respective data storage having instructions that, when executed by the respective processor, cause the tie down locator device to perform respective operations comprising:
  receiving the tie down plan from the storage plan generator,
  causing the light emitting source to project a plurality of light beams toward the anchor points identified in the tie down plan to facilitate connection of the tie down restraints to the anchor points based on the tie down plan.

2. The system of claim 1, wherein the tie down plan further identifies an order in which the tie down restraints are to be connected to the anchor points, and wherein causing the light emitting source to project the plurality of light beams comprises causing the light emitting source to project the plurality of light beams toward the anchor points one light beam at a time based on the identified order.

3. The system of claim 1, wherein the plurality of light beams are color-coded.

4. The system of claim 3, wherein the plurality of light beams identify given anchor points not to be used for connecting the tie down restraints using the color coding.

5. A non-transitory computer-readable medium having stored thereon instructions that, when executed by a computing device, cause the computing device to perform operations that identify tie down restraint locations, the operations comprising:
 receiving storage area information indicative of (i) locations of a plurality of nodes for connecting an end of a tie down restraint to a storage area, and (ii) weight-carrying characteristics of the plurality of nodes;
 receiving cargo information indicative of (i) weight of cargo to be stored in the storage area, and (ii) forces that the cargo is expected to experience while stored in the storage area;
 based on the storage area information and the cargo information, generating a tie down plan that identifies which of the plurality of nodes to use for securing the cargo; and
 causing a light emitting source in communication with the computing device to project a plurality of light beams toward the plurality of nodes identified in the tie down plan to facilitate connection of tie down restraints to the plurality of nodes based on the tie down plan.

6. The non-transitory computer-readable medium of claim 5, wherein the tie down plan further identifies an order in which the tie down restraints are to be connected to the plurality of nodes, and wherein causing the light emitting source to project the plurality of light beams comprises causing the light emitting source to project the plurality of light beams toward the plurality of nodes one light beam at a time based on the identified order.

7. The non-transitory computer-readable medium of claim 5, wherein the light emitting source is located above a floor area in the storage area.

8. The non-transitory computer-readable medium of claim 5, wherein the plurality of light beams are color-coded.

9. The non-transitory computer-readable medium of claim 8, wherein the plurality of light beams identify given nodes not to be used for connecting the tie down restraints using the color coding.

10. The non-transitory computer-readable medium of claim 5, wherein more than one light beam of the plurality of light beams are simultaneously projected to identify the nodes to be connected in parallel.

11. The non-transitory computer-readable medium of claim 5, wherein the weight-carrying characteristics of the plurality of nodes a strength rating.

12. The non-transitory computer-readable medium of claim 5, wherein the light emitting source comprises a laser source.

13. The non-transitory computer-readable medium of claim 5, wherein the light emitting source is a lamp.

14. The non-transitory computer-readable medium of claim 5, wherein each light beam has a color or shape that identifies a weight-carrying characteristic of an associated node.

15. A method for identifying tie down restraint locations, comprising:
   receiving, at a computing device, a tie down plan that identifies which of a plurality of tie down locations to use for securing cargo in a storage area;
   retrieving, by the computing device, location data associated with the tie down locations identified in the tie down plan; and
   based on the tie down plan and the location data, causing, by the computing device, a light emitting source to direct a plurality of light beams at the tie down locations to facilitate connection of tie down restraints to the plurality of tie down locations to secure the cargo.

16. The method of claim 15, further comprising receiving an indication that a tie down restraint is connected at a tie down location.

17. The method of claim 16, wherein the indication that the tie down restraint is connected at the tie down location is a signal generated as a result of an input to a user interface.

18. The method of claim 16, wherein the indication that the tie down restraint is connected at the tie down location is a break in a light beam for greater than a predetermined time period.

19. The method of claim 15, wherein the tie down plan further identifies an order in which the tie down restraints are to be connected to the plurality of tie down locations, and wherein causing the light emitting source to direct the plurality of light beams comprises causing the light emitting source to direct the plurality of light beams toward the plurality of tie down locations one light beam at a time based on the identified order until the tie down plan is completed.

20. The method of claim 15, wherein causing the light emitting source to direct the plurality of light beams comprises causing the light emitting source to direct more than one light beam of the plurality of light beams simultaneously at given tie down locations to be connected in parallel.

* * * * *